(12) United States Patent
Cowles

(10) Patent No.: US 6,372,018 B1
(45) Date of Patent: Apr. 16, 2002

(54) VOC REMOVAL OR DESTRUCTION SYSTEM

(76) Inventor: Harold R. Cowles, 16 Mountain Wood Dr., Scotia, NY (US) 12302

( * ) Notice: Subject to any disclaimer, the term of this patent is extended or adjusted under 35 U.S.C. 154(b) by 0 days.

(21) Appl. No.: 09/525,716

(22) Filed: Mar. 14, 2000

(51) Int. Cl.$^7$ .............................................. B01D 53/04
(52) U.S. Cl. ............................. 95/18; 95/106; 95/123; 95/126; 95/143; 95/148; 96/112; 96/144; 96/145
(58) Field of Search .............................. 95/14, 17, 18, 95/99, 106, 123, 126, 143, 144, 147, 148; 96/109, 145, 146, 112, 122, 123, 126–128, 144

(56) References Cited

U.S. PATENT DOCUMENTS

| | | | |
|---|---|---|---|
| 4,038,050 A | * 7/1977 | Lowther | 96/146 X |
| 4,139,489 A | 2/1979 | Mizuno et al. | 252/411 |
| 4,869,734 A | * 9/1989 | Jacquish | 96/146 X |
| 4,966,611 A | * 10/1990 | Schumacher et al. | 95/18 |
| 5,037,458 A | 8/1991 | Trepaud | 96/109 |
| 5,089,457 A | 2/1992 | Gaylard | 502/5 |
| 5,173,921 A | 12/1992 | Gaylord | 372/115 |
| 5,312,477 A | * 5/1994 | Minor | 95/99 |
| 5,351,418 A | 10/1994 | Plessis | 34/246 |
| 5,377,220 A | 12/1994 | Plessis | 373/120 |
| 5,389,125 A | * 2/1995 | Thayer et al. | 95/17 X |
| 5,406,582 A | 4/1995 | Plessis | 373/115 |
| 5,496,395 A | * 3/1996 | Yamazaki | 96/146 X |
| 5,503,658 A | * 4/1996 | Zarchy et al. | 95/99 |
| 5,505,825 A | * 4/1996 | Gold et al. | 95/126 |
| 5,509,956 A | * 4/1996 | Opperman et al. | 96/146 X |
| 5,595,586 A | * 1/1997 | Sivavec | 95/144 X |
| 5,676,738 A | 10/1997 | Cioffi et al. | 95/109 |
| 5,696,546 A | * 12/1997 | Izumi et al. | 95/123 X |
| 5,702,505 A | * 12/1997 | Izumi et al. | 95/123 X |
| 5,814,132 A | * 9/1998 | Grime et al. | 95/123 |
| 5,908,490 A | * 6/1999 | Akamatsu et al. | 96/145 X |
| 5,958,109 A | * 9/1999 | Fuderer | 95/99 |
| 6,027,550 A | * 2/2000 | Vickery | 95/143 X |
| 6,051,199 A | * 4/2000 | Teller | 95/143 X |

* cited by examiner

Primary Examiner—Robert H. Spitzer
(74) Attorney, Agent, or Firm—Cahill, Sutton & Thomas P.L.C.

(57) ABSTRACT

A VOC removal or destruction system incorporates a regenerator/reactivator having a cylindrical ceramic tube for receiving contaminated adsorbent activated carbon. Electrodes are provided in the ceramic tube in contact with the activated carbon and a programmable logic controller is connected to control the voltage applied to the electrodes and the current flowing through the activated carbon within the tube. The temperature of the material in the tube is controlled by the programmable controller to maintain a temperature within one of two temperature ranges for regenerating the activated carbon and for reactivating the activated carbon. An inert gas is supplied through the tube in contact with the contaminated adsorbent material; the effluent gas including the stripped VOC's is supplied to an oxidizer for destruction. The oxidizer includes a stoichiometric burner providing combustion products for oxidizing the gaseous adsorbate and for providing carrier gas to the regenerator/reactivator.

26 Claims, 3 Drawing Sheets

VOC REMOVAL OR DESTRUCTION SYSTEM

FIELD OF THE INVENTION

The present invention relates to the control of Volatile Organic Compounds (VOC's) and more particularly to the removal of such compounds from an airstream and the subsequent collection or destruction of the compounds.

PRIOR ART

Airstreams incorporating Volatile Organic Compounds are significant environmental hazards which must be cleaned or stripped of these compounds before general release into the atmosphere. The use of activated carbon as a medium for the removal of such VOC's has become well known. Typically, the contaminated airstream is passed through and in intimate contact with activated carbon resulting in the adsorption of the VOC's and the "cleansing" of the airstream. The VOC's may then be removed from the activated carbon by desorbing the VOC's therefrom and either collecting the compounds for possible reuse in a processing environment or destroying the compounds through oxidation or other means.

A prior art VOC control/solvent recovery system is described in U.S. Pat. No. 5,676,738 wherein a fluid bed adsorber is shown utilizing synthetic pyrolized spherical adsorbent material moving in a counter-direction to incoming contaminated gases incorporating VOC's. The counterflowing adsorbent beads and contaminated gas assures intimate contact between the gas and the surfaces of the adsorbent material. The resulting adsorption cleanses the airflow permitting the cleaned air to be exhausted to the atmosphere. The contaminated adsorbent material is then transported to a desorber wherein the VOC material is stripped from the adsorbent material and either condensed for reuse or destroyed in an oxidizer. After substantial use, the efficiency of adsorption is greatly reduced by the continuous adsorption and desorption performed by the adsorption material. In the U.S. Pat. No. 5,676,738 patent the adsorbent material is a synthetic pyrolized spherical adsorbent identified therein as a material known as "AMBER-SORB". Activated carbon beads other than the material identified above are similarly used in VOC removal processes. In all cases, the adsorbent material becomes less efficient in the respective adsorption process through continued use and reuse. The effectiveness of the adsorbent material can be renewed by reactivating the carbon; that is, in prior art VOC removal adsorbing systems, the adsorbent may be removed and subjected to reactivation conditions. The reactivated adsorbent may then be replaced and the system restarted. The requirement for shutting down the VOC removal system to permit the adsorbent to be reactivated is a major expense and limitation of such systems since the shut down of the system requires either an alternate VOC removal system during the adsorbent removal and resupply or the complete shut down of the system from which the contaminated airstream or influent gas is obtained. Efficient continuous operation of systems such as those described in U.S. Pat. No. 5,676,738 can be adversely affected by the requirement to reactivate the adsorbent used in the system.

OBJECTS OF THE INVENTION

It is therefore an object of the present invention to provide a VOC removal or destruction system using activated carbon adsorbents wherein the system can reactivate the adsorbent.

It is also an object of the present invention to provide a VOC removal or destruction system wherein contaminated adsorbent material is regenerated through the utilization of direct electric heating.

It is also an object of the present invention to provide a VOC removal or destruction system wherein contaminated adsorbent material is regenerated through the controlled application of direct electric heating in a cylindrical ceramic heater region within a desorber and wherein the temperature used for the direct electric heating is under program control.

It is a further object of the present invention to provide a VOC removal or destruction system wherein adsorbent material may be regenerated through the application of direct electric heating and wherein the material may be reactivated through application of the same direct electric heating under the control of the programmable controller.

It is still another object of the present invention to provide a VOC removal or destruction system wherein adsorbent materials such as activated carbon can be regenerated and/or reactivated under program control.

It is another object of the present invention to provide a VOC removal or destruction system incorporating a desorber for regenerating contaminated activated carbon through direct electric heating and the passage of an inert gas and wherein the temperature of heating can be increased together with the addition of water or steam to reactivate the activated carbon.

It is still another object of the present invention to provide a VOC removal or destruction system wherein contaminated carrier gas from a desorber is supplied to an oxidizer for oxidizing the VOC's.

It is still another object of the present invention to provide an oxidizer for use in a VOC removal or destruction system wherein the products of combustion of a selected fuel includes an inert gas for supply to the desorber for use as a carrier gas.

It is still another object of the present invention to provide an oxidizer for use in a VOC removal or destruction system wherein the products of combustion of a selected fuel includes an inert gas for supply to the desorber for use as a carrier gas and wherein the temperature of said combustion is sufficient to energize the oxidation process to oxidize the VOC's contained in the contaminated carrier gas.

These and other objects of the present invention will become apparent to those skilled in the art as the description proceeds.

SUMMARY OF THE INVENTION

The present invention incorporates a system for removing VOC's from a contaminated gas stream. The VOC's are removed from the gas stream in any convenient manner and in accordance with prior art techniques. For example, the VOC's may be removed through the use of an adsorber wherein the contaminated gas comes into intimate contact with an adsorbent material such as activated carbon; the VOC's are adsorbed by the material and the clean gas is exhausted into the atmosphere. The contaminated adsorbent material is supplied to a desorber and passed through a cylindrical ceramic tube in contact with spaced electrodes. Electrical power is supplied to the electrodes to generate direct electric heating of the contaminated adsorbent material. An inert gas is passed through and around the adsorbent material to strip the VOC's from the material. The adsorbent material, thus regenerated, is returned to the adsorber for further operation in the removal of VOC's from a contaminated airstream.

The contaminated carrier gas is supplied to an oxidizer and subjected to a temperature sufficient to oxidize the VOC's. The oxidizer includes a burner supplied with a chosen fuel and combustion air. The combustion is stoichiometric and at a sufficient temperature to oxidize the VOC's; however, a portion of the resulting combustion gases of the stoichiometric combustion are directed from the oxidizer to the desorber as an inert carrier gas. This return of the carrier gas may be temperature controlled and may include a provision for the injection of water or steam to enable the desorber, in combination with the programmed higher temperature of the ceramic tube, to act as a reactivation chamber for reactivating the adsorbent material.

BRIEF DESCRIPTION OF THE DRAWINGS

The present invention may more readily be described by reference to the accompanying drawings in which.

DETAILED DESCRIPTION OF THE PREFERRED EMBODIMENT

Figure 1:
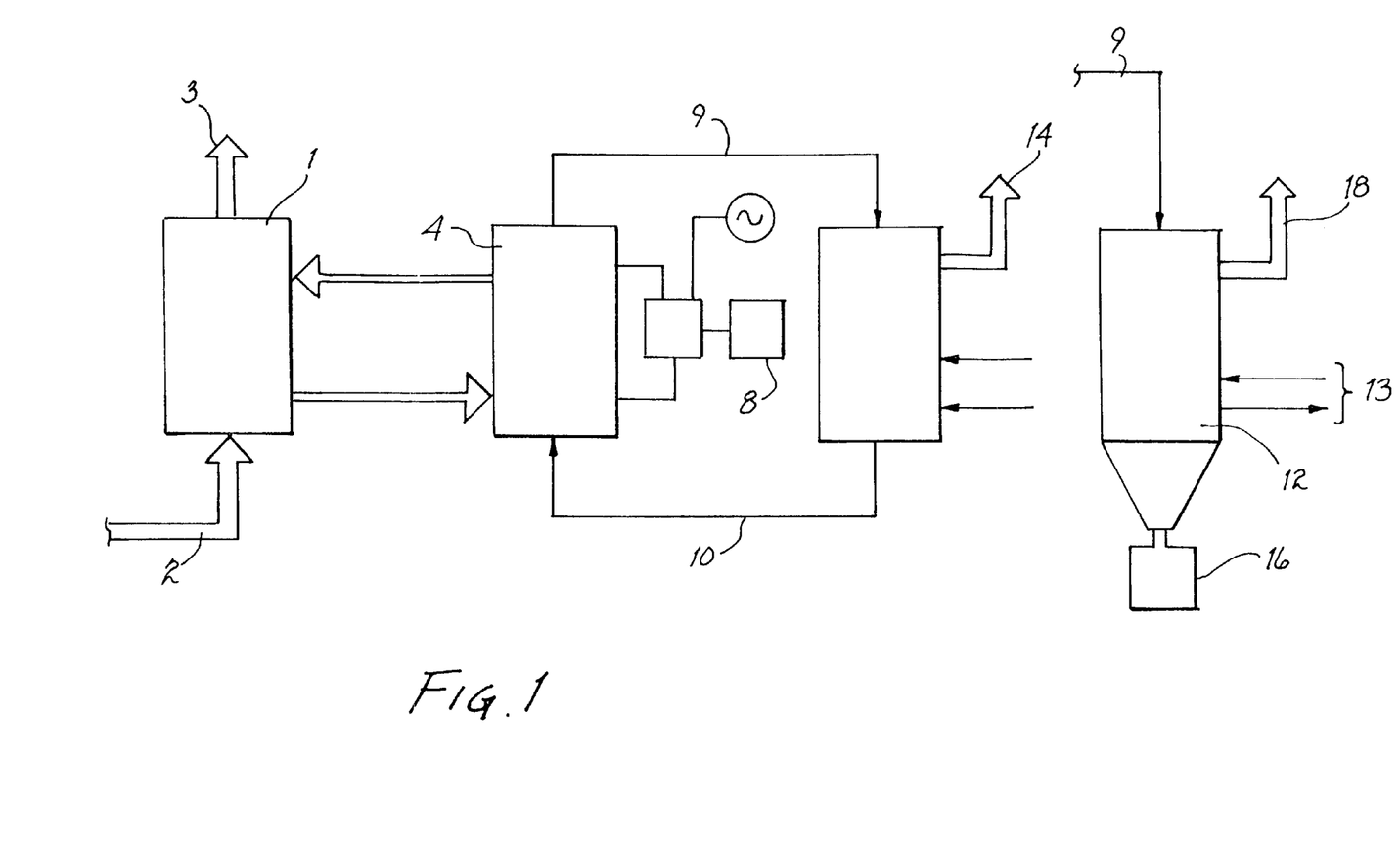
FIG. 1 is a schematic block diagram of a VOC removal or destruction system illustrating the adsorber, desorber, and oxidizer for the removal of VOC's from a contaminated airstream and for the regeneration and reactivation of adsorbent material.

Referring to FIG. 1, a schematic block diagram is shown representing the broad functional elements useful in describing the system of the present invention and the environment in which the present invention is utilized. A collector 1 of VOC contaminated material is shown representing a source of contaminated or "spent" adsorbent material. A moving bed adsorber of the type described in U.S. Pat. No. 5,676,738 is an appropriate source of spent or contaminated adsorbent material; however, other sources of spent adsorbent material may provide the contaminated material, such as moving bed adsorbers or batch vessels, or any other source of adsorbent material having been subjected to contact with a contaminated gas stream 2 containing VOC's. Typically, VOC contaminated air is supplied to the collector or adsorber 1; the contaminated air is passed through and in intimate contact with adsorbent material such that the cleansed air 3 may be exhausted harmlessly to the atmosphere. As the process continues, the adsorbent material will require regeneration. That is, the contaminants adsorbed to the material must be removed to permit the material to be reused. In a continuous process such as that described in the above-identified U.S. patent, the used or spent adsorbent material is transferred to a desorber or regenerator 4 wherein the contaminants are removed from the adsorbent material and fresh regenerated adsorbent is returned to the adsorber 1. Depending on the particular organic compound being removed, the degree of contamination of the airstream from which the VOC is being removed, the type and kind of adsorbent material, the adsorbent material will eventually accumulate residual high-molecular weight materials that are not removed during the successive regeneration processes. Accordingly, these residual materials limit the efficiency of the adsorbent materials in removing the organic compounds from the contaminated airstream. In prior art systems, this deterioration of the effectiveness of the adsorbent material necessitated the periodic removal of the material from the system and off-site reactivation of the adsorbent. Typically, such reactivation requires temperatures greatly in excess of those required for regeneration of the material and the use of sufficient inert gas and water to induce a water-gas shift reaction. The requirement to remove the contaminated adsorbent material from the system and to reactivate the material is a major disruption to the smooth and efficient continuous operation of the overall VOC removal system.

The present invention incorporates a regenerator/reactivator that performs the desorbing action of previous desorbers but also selectively provides reactivation of the adsorbent material under program control through the use of a modulated power supply directly heating the contaminated adsorbent material. Thus, the desorber is both a regenerator and a reactivator.

The organic compounds and carrier gas resulting from the regeneration/reactivation process is supplied, in a preferred embodiment, to an oxidizer 6. The oxidizer is provided with fuel 5 and air 7 to operate a burner in a unique manner to effectively destroy the contaminants contained in the carrier gas from the regenerator/reactivator while producing a cleansed carrier gas to be returned to the regenerator/reactivator. The effluent gas 14 resulting from the combustion of the contaminated carrier gas is cleansed and safely returned to the atmosphere. Further, provision is made for injecting sufficient moisture in the carrier gas to permit reactivation of the adsorbent material when such reactivation is dictated by the programmable logic controller 8 and the temperature within the regenerator/reactivator is raised to the appropriate reactivation value.

Thus, in the system of the present invention, the spent or contaminated adsorbent material is supplied to a regenerator/reactivator 4 wherein the adsorbed VOC's are desorbed to permit reuse of the adsorbent material; periodically, and at chosen intervals, the adsorbent material is reactivated to restore the adsorbent material and to renew the inherent adsorbent pore structure of the material. The regeneration/reactivation of the adsorbent material is performed selectively to accommodate the physical parameters of the adsorbent material, the VOC's, and other requirements for the application of the system. It is important to note that the process can be continuous; that is, the regeneration and/or reactivation of the adsorbent material is selective through the manipulation of process parameters (to be described) without rendering the process discontinuous.

The stripped VOC's derived from the desorption of the adsorbent material may then be delivered 9 to a conventional condenser 12 for condensation to recapture the VOC's in liquid form for reuse; however, in the preferred embodiment, the VOC's are supplied 9 to an oxidizer 6 that destroys the VOC's and provides a suitable gas as a carrier 10 for the regeneration of the adsorbent material in the adsorber 1.

In an alternative embodiment, the conventional condenser 12 receives the gas stream containing the stripped VOC's, is supplied for example with cooling water 13, and collects the condensed liquid VOC's in condensate collector 16 for further handling or reuse. The cleansed effluent gas 18 may then be exhausted to the atmosphere.

Figure 2:
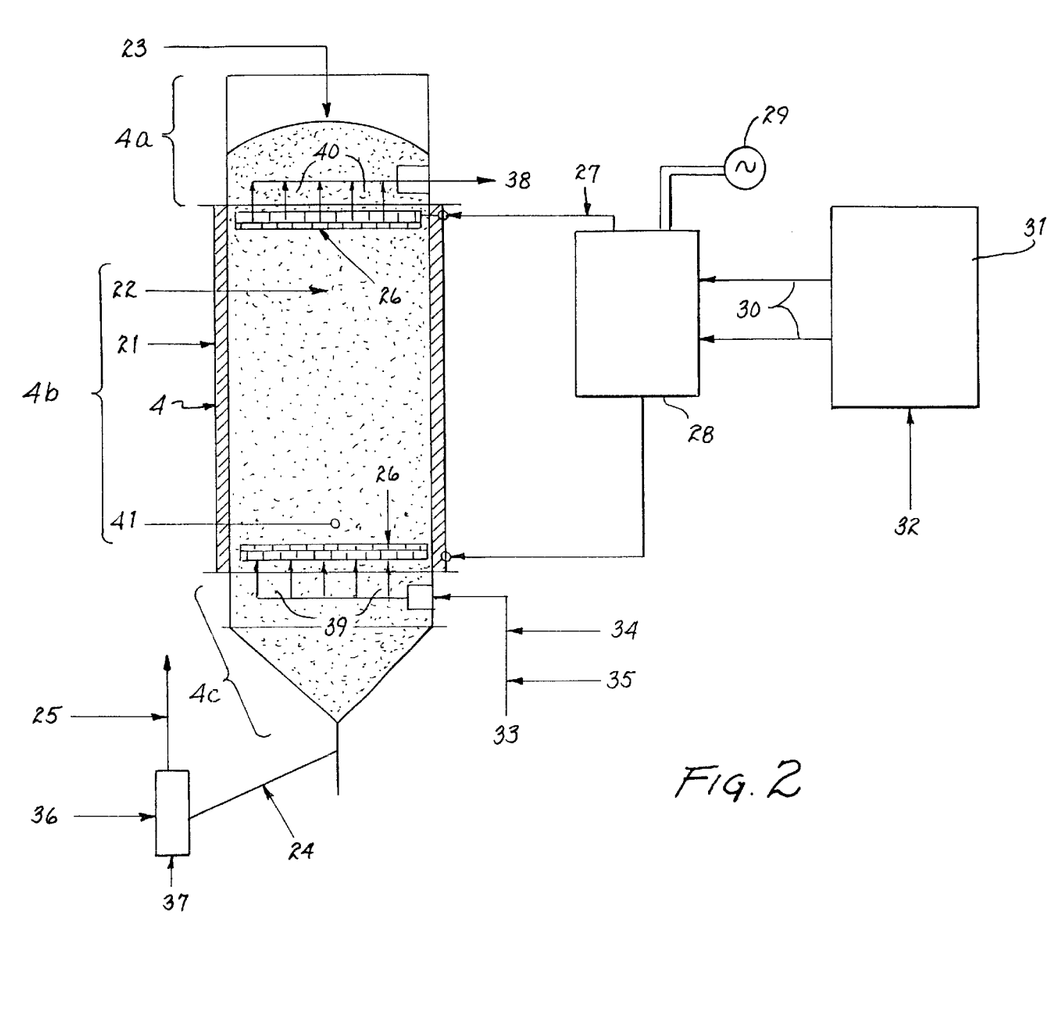
FIG. 2 is an illustration of a regenerator/reactivator in accordance with the invention.

Referring now to FIG. 2, a regenerator/reactivator is shown for desorbing adsorbent material therein while permitting reactivation at selected times and intervals. The contaminated adsorbent material 22 is transferred to a regeneration vessel such as desorber 4 via pipe 23. The vessel 4 includes an inlet section 4a, a heated section 4b and an outlet section 4c. The adsorbent can be in any form; however, spherical material which is by its nature electrically conductive, or which can be made to be electrically conductive, is preferred. Examples of such materials are Kureha Chemical Industries' BAC-G-70R beaded carbon, and Rohm & Haas A600 Ambersorb spherical, pyrolized, synthetic carbonaceous adsorbent. The invention is not limited to these materials and only requires the material to exhibit electrical conductivity and have a resistance to permit the passage of electrical current to generate heat. The adsorbent fills the chamber as a packed bed, such that no voids are present. The bed can remain static for this procedure, or it can be moved intermittently to process the adsorbent in a batch mode. However, the preferred method is to continuously move the carbon through the heated section 4b of the vessel 4 including a cylindrical desorber tube 21 and electrodes 26 positioned at the entrance and exit of the cylindrical tube. The moving bed provides optimum adsorbent particle spacing and contact, and electrical current distribution, thus optimizing power use and heat profile. The electrodes 26 may take any of a variety of forms including flat plates having apertures distributed thereacross. The adsorbent material flows through the apertures to maintain a compact moving bed; alternatively, the electrodes may be formed from horizontal spaced bars permitting the adsorbent material to pass between the bars into the cylindrical tube. Regardless of the form of the electrodes, they are in intimate contact with the top and bottom of the adsorbent material in the packed bed to provide good electrical contact with the bed material.

In the preferred operating mode using a constantly moving bed, the rate of adsorbent flow is controlled by transfer device 36. The preferred method of transfer involves the injection of air or gases 37 into device 36, which entrains the adsorbent and carries it out of the device via outlet pipe 25 to an adsorber such as that shown at 1 in FIG. 1. The adsorbent feeds continuously and evenly from the outlet sections 4c through pipe 24 by gravity.

As the adsorbent flows steadily through tube 21, it passes over and between electrodes 26, mounted at the top and bottom of the tube 21. As this is taking place, electrical power is applied constantly to electrodes 26 from modulated power supply 28 via conductors 27 attached directly to electrodes 26. Electrical power source 29 connected to modulator 28 can be of various voltages, and can be either alternating current (AC) or direct current (DC).

Adsorbent 22 is characterized by a moderate electrical resistance. As power is applied to the electrodes 26, a current flows between the electrodes through the mass of adsorbent 22. The electrical resistance of the adsorbent causes each particle to heat rapidly, as a function of current flow which, in turn, is controlled by the applied voltage and the nature of the VOC. There may also be heat generated in the adsorbed material itself, by the flow of current in this adsorbate. In either case, a smooth and rapid increase in the temperature of the adsorbent and adsorbate is achieved. The temperature of the adsorbent mass 22 is regulated to a selected temperature range by the modular power supply 28 which in turn is controlled by the programmable logic controller 31. The programmable logic controller is a familiar control circuit to provide output control signals in response to detected input conditions such as thermocouple output signals. It will be appreciated by those skilled in the art that any of several commercially available logic controllers may be used.

The voltage applied by the modulated power supply 28 will be a function of the type of adsorbent, the type of adsorbate, and the mass flow rate of the adsorbent. During the heating process, a carrier gas 33 is piped into the bottom of the desorber tube 21. The carrier gas serves two functions: (a) it maintains an inert and safe condition in the desorber, and (b) it purges desorbed vapors from the interstitial spaces of the adsorbent bed. The carrier gas distributed as indicated at 39 flows upward through the adsorbent 22, as the latter is moving downward. This counter-current flow optimizes the process of desorption.

The inert carrier gas 39 combines with and purges the desorbed material from adsorbent 22, and flows as a fuel rich (organic vapor rich) stream 40 out of the desorber via outlet pipe 38. This highly concentrated gas stream can be conveyed to a recovery device such as a condenser, or a destruction device such as an oxidizer or plasma chamber. Note that the carrier can be an inert gas, such as nitrogen supplied at 33 from tanks, or it can be water vapor supplied at 35, flue gas supplied at 34, or combinations thereof. Various combinations can be manifolded together as shown at 33, 34 and 35. The source of the carrier gas may vary, but in the preferred embodiment using the oxidizer 6 (FIG. 1), the carrier gas may be generated as a by-product of the combustion process (to be described).

As previously described, the resistance profile of the bed, and therefore the voltage required, is a function of mass flow rates of adsorbent and type of adsorbate. The profile is also affected by the type and flow rate of carrier gas 39. To accommodate the complexity of variables, a system of automated control is provided. Thus, the regeneration technique of the present invention incorporates a programmable logic controller 31 for system monitoring and control.

The programmable logic controller 31 is adjusted to control the adsorbent temperatures during the regeneration process to a preset value within a range of 200° F. to 1000° F. and preferably within a range of 400° F. to 600° F. The target temperature can be reset if process conditions dictate. A thermocouple 41 constantly monitors maximum adsorbent bed 22 temperature (several strategically placed thermocouples may be used). A signal 32 is sent from the thermocouple 41 to the logic controller 31. The controller program provides control signals 30 to modulated power supply 28 to maintain the target temperature at a pre-selected or programmed temperature by controlling the voltage applied to electrodes 26.

Adsorbent which has been regenerated exits the bottom of the system and is transferred for reuse via pipe 24, transfer device 36, and pipe 25. The adsorbent material thus regenerated shows superior performance compared with older indirect heat transfer methods when operated at equivalent temperatures.

The direct application of electrical power for heating adsorbents has been discussed in the prior art; however, in prior art applications, the systems were either impractical or impossible to operate. One prior art system exclusively used a steam carrier and used a steel vessel, which was lined with glass or high performance plastic; the system was capable only of regeneration. This design suffered from temperature limitations and short circuits. In the case of glass lining, the different coefficients of expansion of the materials caused cracks in the glass and short circuiting of power to the steel shell. In the case of the plastic liner, temperatures were limited and thus the quality of regenerated adsorbent was limited. Also, the plastic suffered from dielectric breakdown, and short circuiting to the shell. As a consequence, the process is severely limited and not commercially feasible. Refractory materials not specifically machinable and castable do not provide thermal and dielectric properties that permit the dual purpose of the regeneration/reactivation desorber 4 of the present invention. Such materials require limitations in operating temperatures to values unacceptable to the present invention and/or become structurally unsound requiring a non-monolithic construction giving rise to electrical and structural problems. Other systems were used exclusively for reactivation with a stream carrier and incorporated steel vessels.

In contrast, the present invention incorporates a totally ceramic heated cylinder as the desorber tube 31. A suitable ceramic material is available from Blasch Precision Ceramic and identified as BP 67/8-SC. It has the advantages of being fully machinable, structurally strong, and being castable into large, custom shapes. And, of great importance are its high dielectric constant and high temperature capabilities. These are distinct advantages in conjunction with the monolithic and single material design of the desorber heated zone 4b formed by the tube 21. The system could be operated at temperatures in excess of 2,000° F., if desired.

In systems of the prior art, the design, operation and materials of construction usually limit their use to low temperature operation. Thus, only low temperature regeneration is available using regenerators or desorbers of the prior art. Other prior art systems are intended solely for high temperature water-gas shift reactivation of adsorbent material. The present system incorporates a distinct advantage in being able to provide not only an improved desorber design but also permits reactivation of the adsorbent material. The system herein described allows both regeneration and reactivation to be conducted in a single system by controlling temperature and type of carrier gas; further, reactivation does not require the system to be shut down. In the preferred embodiment, the present system involves a routine of operation at a regeneration temperature typically in the range of 400–600° F. with some periodic operation at higher temperatures if desired. In this regeneration mode, the adsorbent undergoes thermal desorption only. The inert carrier can be nitrogen, steam, flue gas, other inert gases, or any combination thereof. It is also possible to periodically elevate the temperature to achieve a higher level of regeneration through thermal desorption of higher boiling material which is not normally removed at lower temperatures. Thus, through the utilization of the programmable logic controller 31, the temperature can be selected to derive the appropriate regeneration of the adsorbent. When it is deemed appropriate, the present system allows the periodic operation at reactivation conditions; that is, at temperatures approximately 1400° F. in the presence of water vapor. The reactivation range of temperatures can extend from about 1400° F. to 1800° F. although the preferred range is about 1400° F. to 1500° F. No modifications are needed to the system since the programmable logic controller need only select the appropriate temperature for the modulated power supply while water vapor can be supplied to the system. In this reactivation mode, all carbonaceous material is removed from the adsorbent pores. At about 1400° F., a large quantity of H and OH free radicals are formed from the water vapor in situ. All carbonaceous material is oxidized by the hydroxyl free radical. This renews the adsorbent pore structure. Water vapor can be injected into the inert carrier gas, or the water vapor can be intrinsic to the flue gas (from oxidizer 6 if desired) when flue gas is used for the desorption carrier. The source of water vapor can be derived from both injected and intrinsic vapor. The use of steam alone is also practical.

Thus, when the desorber 4 is used in a system such as that shown in FIG. 1, it becomes a regenerator/reactivator. The spent adsorbent material from the source of contaminated material such as a moving bed adsorber supplies the contaminated material via pipe 23 and, in turn, is provided with return adsorbent material, regenerated, via outlet pipe 25. The adsorbed material being returned can also be reactivated to provide efficient adsorption of the VOC's in a contaminated air stream. The exiting carrier gas from the desorber 4 is delivered via outlet pipe 38 for further handling. This vapor rich exhaust stream can be delivered to a recovery device such as a condenser or can be delivered to a destruction device such as an oxidizer, an ultraviolet light/ozone system, or other prior art VOC destruction technique; however, in the prefered embodiment, it is delivered to a unique oxidizer for destruction. An oxidizer constructed in accordance with the teachings of the present invention for use in the present system is shown in FIG. 3.

Figure 3:
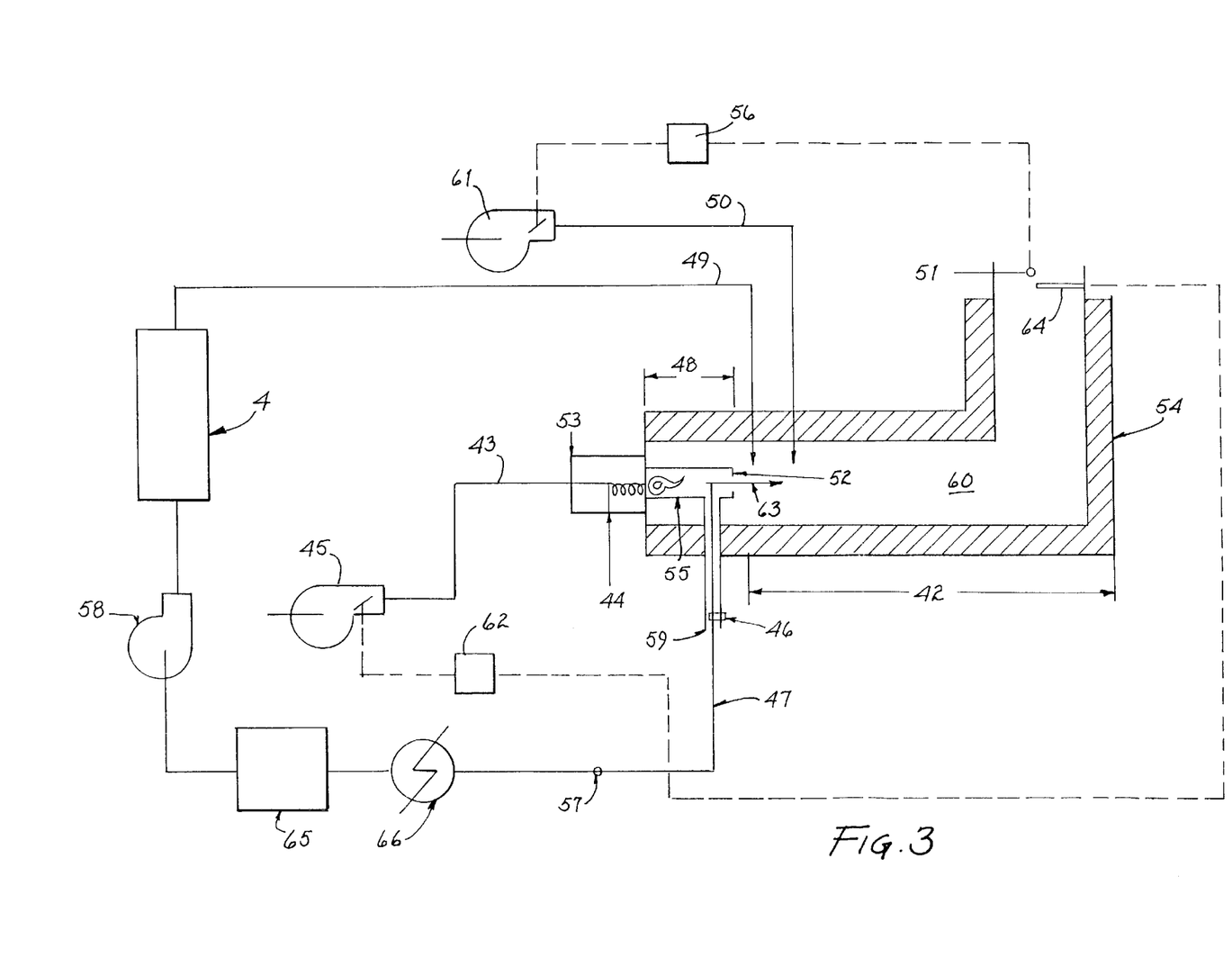
FIG. 3 is an illustration of an oxidizer constructed in accordance with the teachings of the present invention to provide for the oxidizing of VOC's and the generation of an inert gas for use as a carrier gas for regeneration and/or reactivation of adsorbent material.

Referring now to FIG. 3, a primary combustion process takes place in combustion chamber 55. Fuel 44 and high pressure combustion air 43 are fed to a suitable nozzle mix burner 53 to provide a stoichiometric combustion. The oxygen-free combustion products 63 enter the second stage 42 of the oxidation chamber 60; the oxidation chamber includes insulation material 54 such as a refractory lined steel tube, or other suitable material capable of withstanding the high temperatures arising from stoichiometric oxidation (~3,500° F., e.g., in the case of natural gas).

Burner 53 is designed with an outlet area 52 having a reduced cross section. The reduced cross section provides back pressure which will direct a portion of the inert gas from the combustion chamber 55 out through a side take off pipe 59 to provide a feedback path for inert gas for use in the desorber 4. The side take off pipe 59 may contain a restrictor orifice 57 for precise flow control. The feedback path may include a heat exchanger 66, and/or a moisture injection section 65 which provides a means for water or steam injection. Water or steam injection provides cooling and/or increased humidity. The feedback path from gas take off pipe 59 may also include a blower 58 to assist with conveying inert gas to desorber 4.

The inert gas flow train described above provides a means of conveying a carrier gas 47 to the desorber 4—an essential step in the regeneration process taking place in desorber. An oxygen sensor 46 continuously monitors the inert gas to verify minimal $O_2$ content (<0.5% by volume).

In the desorber 4, the inert gas provides a means of safe operation by eliminating $O_2$ and thereby avoiding the opportunity for fire or explosion. It is also used to purge desorbed volatile organic compounds from desorber 4. The combination of inert carrier gas and desorbed VOC's is conveyed out of the desorber top via pipe 49 to the secondary chamber 42 of the oxidation chamber 60. As stated previously, it is important that all sections of the overall oxidation system shell are lined with refractory material 54 to withstand high temperatures internally, and to prevent the shell from heating to an unsafe temperature. The desorber off gas, comprising the inert carrier and the highly concentrated VOC's, is highly fuel rich. This gas is conveyed to the oxidizer secondary chamber 42 via sealed pipe 49.

Hot gas from combustion chamber 55 is discharged into the secondary chamber 42 through the restricted burner opening 52. This hot gas provides sufficient energy to "pilot" the oxidation process which will destroy the fuel rich desorbate stream from pipe 49. Since this VOC stream is fuel rich, it is also necessary to add supplemental combustion air 50 by using a secondary air blower 61. Alternatively, the blower 45 discharge can be used for both the primary burner and supplemental air supply. The supplemental air 50 and the contaminated carrier air line 49 can be introduced down stream of stage 48, or directly in stage 48. Introduction of these gases close to the burner structure provides additional cooling of chamber 55, and also premixes the VOC's and air to enhance combustion efficiency in section 42.

Secondary air blower 61, or a separate discharge from combustion blower 45, may have a modulating damper to control flow rate. The flow rate will be controlled to maintain a final flue gas temperature of nominally 1,500° F. This temperature is measured by thermocouple 51. A signal from the thermocouple 51 is sent to a controller 56 to regulate the combustion air damper.

An alternative operation mode can be carried out by using burner 53 only as a stoichiometric pilot flame. In this case, combustion air blower 45 would be modulated by controller 62 based on output from oxygen sensor 64, to maintain a final flue gas $O_2$ content at <0.5%.

The invention will now be described by way of examples; these examples are illustrative only and are not exhaustive of the methods and apparatus for practicing the invention claimed herein.

EXAMPLE 1

A supply of contaminated adsorbent material in the form of spherical activated carbon beads was directed through a desorber. The desorber was constructed of a castable machinable ceramic formed into a cylinder having an inside diameter of approximately 16 inches, a thickness of approximately ½ inch and a length of 60 inches. Electrodes were placed near the entrance and exit of the ceramic tube, each comprising a metal ring having horizontal bars arranged in parallel extending from one side of the ring to the other. The bars were arranged with approximately 1 inch spacing therebetween with each of the bars approximately 3/16 inches thick. The bars were connected to a modulated power supply controlled by a programmable logic controller. The controller was programmed to maintain the temperature of the adsorbent material within the ceramic tube at a temperature of approximately 500° F.; the modulated power supply regulated the voltage applied to the electrodes creating a current passing through the adsorbent material and thus heating the material. The material was maintained at approximately 500° F. The adsorbent material moved downwardly through the ceramic tube and inert gas (nitrogen) was directed upwardly through the ceramic cylinder in a counter-flowing relation to the downward traveling adsorbent material. The adsorbed contaminates (VOC's) were stripped from the adsorbent material and the carrier gas thus contaminated with the VOC's was directed to a conventional condenser. The organic solvents were condensed and collected for further use. The activated carbon adsorbent material exiting the bottom of the tube appeared regenerated and appropriate for delivery to an adsorber for reuse.

EXAMPLE 2

A continuous supply of contaminated adsorbent material in the form of activated carbon spheres was supplied to the top of a ceramic cylinder as described in Example 1. The programmable logic controller was adjusted to control the modulated power supply for maintaining a temperature of the moving mass within the ceramic cylinder to approximately 1,400° F. As the mass of adsorbent material was moving downwardly through the ceramic tube, flue gas (the result of stoichiometric combustion) and steam was passed upwardly through the mass in a counter-flow relationship to the activated carbon beads. The result of the intimate contact of the heated carbon material with the carrier gas comprising the flue gas and steam stripped all adsorbed VOC's and as a result of the high temperature and presence of steam oxidized all carbonaceous material and restored the adsorbent pore structure. The effluent carrier gas (exiting flue gas stream and contaminates) was directed from the top of the cylinder for further handling. The adsorbent material exiting the bottom heated cylindrical tube appeared reactivated with excellent pore structure to subsequently be used to remove contaminates (VOC's) from a gas stream in an adsorber.

EXAMPLE 3

A continuous quantity of contaminated adsorbent material was directed through an electrode into the interior of a cylindrical ceramic tube as described in Example 1. The mass of contaminated adsorbent material in the tube was heated through the action of current flow between electrodes positioned at the entrance and exit of the ceramic tube. The temperature was controlled and was maintained at approximately 500° F. Flue gas (the product of a stoichiometric combustion) was directed in a counter-flow direction through the tube to contact the heated material and strip the contaminating adsorbed VOC's. The regenerated adsorbent material was continuously moved from the bottom of the tube and supplied to an adsorber for use in cleansing a contaminated air stream. The contaminated carrier air exiting the top of the ceramic tube contained the inert flue gas and the products of the stripping within the ceramic tube. That is, the exiting carrier gas was a fuel-rich gas containing the contaminates that have been removed from the adsorbent material in the ceramic tube. The contaminated carrier gas was directed to an oxidation chamber where it was subjected to the high temperature (approximately 3400° F.) of a stoichiometric combustion. Supplemental air was supplied to the chamber to insure complete combustion of the contaminating components of the carrier air. The stoichiometric combustion was generated in a burner through the use of a fuel, such as natural gas or propane, and combustion air in appropriate ratio to insure stoichiometry. The outlet area of the burner was slightly reduced to create sufficient pressure to permit a take-off pipe to be secured to the side of the burner combustion chamber and to permit part of the combustion gas to be removed from the burner. The combustion gas thus removed from the burner was cooled through a heat exchanger and supplied to the heated ceramic tube as a carrier gas in the desorbing process. The effluent gases from the desorber appeared to have been completely oxidized in the oxidizing chamber while the carrier gas generated by the stoichiometric combustion performed properly in the desorber.

EXAMPLE 4

The process of Example 3 was repeated except that the logic controller was programmed to control the modulated power supply such that the current flowing through the moving mass of contaminated adsorbent in the ceramic tube generated and maintained a temperature of approximately 1500° F. The inert gas tapped from the stoichiometric combustion in the burner was passed through a heat exchanger for temperature control and steam was injected into this hot inert gas. The inert gas and steam was directed to the bottom of the heated ceramic tube to pass upwardly therethrough in a counter-flow direction with respect to the adsorbent material. The high temperature maintained within the ceramic tube and the presence of water vapor resulted in reactivation of the activated carbon adsorbent material. The effluent carrier gas was then collected and redirected back to the oxidizer for destruction of all contaminants stripped from the adsorbent material.

The use of a portion of stoichiometric combustion products as a carrier gas in regeneration and/or reactivation provides an option for improving the efficiency of the system; that is, the carrier gas thus generated is at an elevated temperature before entering the regenerating or reactivating area in the ceramic tube. Therefore, less power is required to sustain the reaction within the vessel. Further, the cleaned effluent gas from the oxidizer may conveniently be used as a pre-heat medium to preheat the contaminated adsorbent material as it enters the inlet section 4a of the desorber 4.

The present invention has been described in terms of selected specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

What is claimed is:

1. The process of removing VOC's from a contaminated adsorbent material comprising the steps of:
   (a) providing a ceramic tube having first and second electrodes therein;
   (b) directing contaminated adsorbent material into said tube in contact with said electrodes;
   (c) applying a voltage between said electrodes to create an electric current through said contaminated material to heat the adsorbent material;
   (d) providing a programmable logic controller for controlling the current through said material in response to the temperature of said material;
   (e) programming said controller to maintain the temperature of said material to a value within one of two temperature ranges;
   (f) stripping adsorbed VOC's from said adsorbent material by directing an inert gas through said tube in contact with the heated adsorbent material.

2. The process of claim 1, wherein said two temperature ranges are 200° F. to 1000° F. and 1400° F. to 1800° F. respectively.

3. The process of claim 1 wherein said temperature ranges are 400° F. to 600° F. and 1400° F. to 1500° F. respectively.

4. The process of claim 1, wherein said absorbent material is activated carbon and said inert gas is one of a group consisting of nitrogen, flue gas, and steam.

5. The process of removing VOC's from contaminated activated carbon adsorbent material comprising the steps of:
   (a) providing a ceramic tube having first and second electrodes therein;
   (b) continuously directing contaminated activated carbon adsorbent material into said tube in contact with said electrodes;
   (c) applying a voltage between said electrodes to create an electrical current through said contaminated material to heat the activated carbon;
   (d) providing a programmable logic controller for controlling the current through said contaminated activated carbon material in response to the temperature of said material;
   (e) programming said controller to maintain the temperature of said material to a value within one of two temperature ranges for selectively regenerating or reactivating said activated carbon;
   (f) stripping adsorbed VOC's from said activated carbon by directing an inert gas through said tube in contact with the heated adsorbent material when a first temperature range is maintained;
   (g) stripping adsorbed VOC's from said activated carbon and reactivating said carbon by directing an inert gas including steam through said tube in contact with the heated adsorbent material when a second temperature range is maintained.

6. The process of claim 5, wherein said two temperature ranges are 200° F. to 1000° F. and 1400° F. to 1800° F. respectively.

7. The process of claim 5, wherein said temperature ranges are 400° F. to 600° F. and 1400° F. to 1500° F. respectively.

8. The process of claim 5, wherein said inert gas is one of a group consisting of nitrogen, flue gas, and steam.

9. The process of oxidizing a gaseous contaminant in a carrier gas comprising the steps:
   (a) providing a burner having a combustion chamber;
   (b) stoichiometrically combusting a fuel and air in said combustion chamber;
   (c) removing a portion of the products of said stoichiometric combustion from said combustion chamber for use elsewhere;
   (d) providing an oxidizer chamber;
   (e) directing the remaining products of said stoichiometric combustion into said oxidizer chamber;
   (f) oxidizing said gaseous contaminants by directing said carrier gas and said gaseous contaminants into the oxidizer chamber into contact with the products of said stoichiometric combustion.

10. A VOC removal system for removing adsorbed VOC's from contaminated adsorbent material comprising:
    (a) a source of contaminated adsorbent material;
    (b) a regenerator/reactivator for receiving said contaminated adsorbent materials from said source including;
       i. a cylindrical tube of castable machinable ceramic through which said contaminated material is directed;
       ii. first and second electrodes positioned in said tube in contact with the contaminated adsorbent;
       iii. a programmable controller for controlling an electrical current flowing between said electrodes to generate heat in said adsorbent material;
       iv. said controller responsive to the temperature of said adsorbent between said electrodes for controlling said current to maintain a predetermined temperature of the contaminated adsorbent between said electrodes;
       v. said controller programmable to maintain a first range of temperatures of the contaminated adsorbent to regenerate the adsorbent, and programmable to maintain a second range of temperatures of the contaminated adsorbent to reactivate the adsorbent;
    (c) a source of carrier gas connected to said regenerator/reactivator for providing a gas to strip contaminates from the heated contaminated adsorbent material in said regenerator/reactivator;
    (d) a gaseous desorbant collection means connected to receive effluent carrier gas and VOC's from the regenerator/reactivator for further handling and collection or destruction of the VOC's.

11. The combination set forth in claim 11 wherein said source of contaminated adsorbent material is an adsorber.

12. The combination as set fourth in claim 10 wherein said first range of temperatures is from 200° F. to 1000° F.

13. The combination set forth in claim 10 wherein said second range of temperatures is from 1400° F. to 1800° F.

14. The combination set forth in claim 10 wherein said carrier gas is an inert gas and is one of a group consisting of nitrogen, flue gas, and steam.

15. The combination set forth in claim 10 wherein said carrier gas is a combination of two or more gases from the group consisting of nitrogen, flue gas and steam.

16. The combination set forth in claim 10 wherein said gaseous desorbent collection means is a condenser to condense gaseous VOC's for reuse.

17. The combination set forth in claim 10 wherein said gaseous desorbent collection means comprises an oxidizer for destruction of VOC's.

18. The combination set forth in claim 10 wherein said gaseous desorbent collection means comprises an oxidizer, said oxidizer having:
   (a) an oxidation chamber;
   (b) a stoichiometric burner for stoichiometrically combusting a fuel and air in a burner combustion chamber;
   (c) said combustion chamber having an outlet for directing combustion products into said oxidation chamber;
   (d) the outlet having a smaller cross-sectional area than said combustion chamber to create a positive pressure within the combustion chamber;
   (e) a take-off pipe connected to said combustion chamber to permit a portion of the combustion products, at said positive pressure, to be removed and to be delivered for use elsewhere in the system as an inert carrier gas.

19. A regenerator/reactivator for removing adsorbed VOC's from contaminated adsorbent material in the form of activated carbon comprising:
   (a) an inlet section for receiving adsorbent materials and adsorbed VOC's;
   (b) a heated section for receiving contaminated adsorbent from said inlet section and for regenerating/reactivating said material;
   (c) an outlet section for receiving regenerated/reactivated adherent material from said heated section, said heated section including:
      i. a cylindrical tube of castable machinable ceramic through which said contaminated material is directed;
      ii. first and second electrodes positioned in said tube in contact with the contaminated adsorbent;
      iii. a programmable controller for controlling an electrical current flowing between said electrodes to generate heat in said adsorbent material;
      iv. said controller responsive to the temperature of said adsorbent between said electrodes for controlling said current to maintain a predetermined temperature of the contaminated adsorbent between said electrodes;
      v. said controller programmable to maintain a first range of temperatures of the contaminated adsorbent to regenerate the adsorbent, and programmable to maintain a second range of temperatures of the contaminated adsorbent to reactivate the adsorbent.

20. The combination set forth in claim 19 wherein said first range of temperatures is from 200° F. to 1000° F.

21. The combination set forth in claim 19 wherein said second range of temperatures is from 1400° F. to 1800° F.

22. The combination set forth in claim 19 wherein said carrier gas is an inert gas and is one of a group consisting of nitrogen, flue gas and steam.

23. The combination set forth in claim 19 wherein said carrier gas is a combination of two or more gases from the group consisting of nitrogen, flue gas and steam.

24. An oxidizer apparatus comprising:
   (a) an oxidation chamber;
   (b) a stoichiometric burner for stoichiometrically combusting a fuel and air in a burner combustion chamber;
   (c) said combustion chamber having an outlet for directing combustion products into said oxidation chamber;
   (d) the outlet having a smaller cross-sectional area than said combustion chamber to create a positive pressure;
   (e) a take-off pipe connected to said combustion chamber to permit a portion of the combustion products at said positive pressure to be removed to be delivered for use elsewhere.

25. The combination set forth in claim 24 including means connecting a source of VOC contaminated carrier gas to said oxidation chamber together with supplemental air for oxidation within said oxidation chamber.

26. An oxidizer for use in a VOC removal system comprising:
   (a) an oxidation chamber for oxidizing VOC's carried by a desorbate vapor;
   (b) a stoichiometric burner for stoichiometrically combusting a fuel and air in a burner combustion chamber;
   (c) said combustion chamber having an outlet for directing combustion products into said oxidation chamber;
   (d) the outlet having a smaller cross-sectional area than said combustion chamber to create a positive pressure within said combustion chamber;
   (e) a take-off pipe connected to said combustion chamber to permit a portion of the combustion products at said positive pressure to be removed to be delivered for use elsewhere;
   (f) means directing said desorbate vapor and supplemental combustion air into said oxidation chamber into contact with the combustion products of said combustion chamber.

* * * * *